United States Patent [19]

Clark

[11] Patent Number: 5,290,479
[45] Date of Patent: Mar. 1, 1994

[54] SURFACTANT SYSTEM OF POLYETHOXYLATED COMPOUNDS AND GLYCERIDE COMPOUNDS

[75] Inventor: Earl Clark, Bartlesville, Okla.

[73] Assignee: Phillips Petroleum Company, Bartlesville, Okla.

[21] Appl. No.: 466,569

[22] Filed: Jan. 17, 1990

Related U.S. Application Data

[60] Division of Ser. No. 251,425, Sep. 30, 1988, Pat. No. 4,906,701, which is a continuation-in-part of Ser. No. 224,596, Jul. 26, 1988, abandoned, which is a division of Ser. No. 939,641, Dec. 9, 1986, Pat. No. 4,764,574.

[51] Int. Cl.$^5$ .............................................. B01F 17/42
[52] U.S. Cl. ................................ 252/351; 252/174.21; 252/174.22; 252/356
[58] Field of Search ...................... 252/174.21, 174.22, 252/351, 356

[56] References Cited

U.S. PATENT DOCUMENTS

| | | |
|---|---|---|
| 3,251,816 | 5/1966 | Furendal et al. . |
| 3,284,393 | 11/1966 | Vanderhoff et al. . |
| 3,957,395 | 5/1976 | Cabestany et al. ................. 526/207 |
| 3,997,492 | 12/1976 | Kane et al. . |
| 4,002,589 | 1/1977 | Farley et al. . |
| 4,078,133 | 3/1978 | Ozima ................................. 526/206 |
| 4,147,681 | 4/1979 | Lim et al. . |
| 4,359,391 | 11/1982 | Salathiel et al. ............... 252/8.55 C |
| 4,379,883 | 4/1983 | Zecher ................................... 524/801 |
| 4,420,596 | 12/1983 | Lockhead et al. ................... 526/212 |
| 4,617,362 | 10/1986 | Becker et al. ....................... 526/209 |
| 4,753,981 | 6/1988 | Clark, Jr. ............................. 524/801 |
| 4,764,574 | 8/1988 | Clark, Jr. ............................. 526/207 |

OTHER PUBLICATIONS

McCutcheans Detergents and Emulsifiers, 1978 American (North) Edition.
DiStefano, F. V. et al. "Inverse Emulsion Polymerization of Acrylamide: Polymerization Kinetics and Process Development" AICHE 1983 Spring Meeting, Mar. 27–31, Houston, Tex.
Wu, Muyen Michael, "Polymerization of Acrylamide in Water–in–oil Microemulsions" PhD Dissertation, Univ. of Akron University, Microfilms International, 1983.
Vanderhoff, J. W. et al. "Inverse EMulsion Polymerization" In: Polymerization and Polycondensation Processes, Adv. Chem. Ser. 34, 1962, pp. 32–51.
"General Characteristics of Atlas Surfactants", Atlas Chemical Industries, Inc. Wilmington, Del. 1963.
"Atlas Surface Active Agents", Atlas Powder Co. Wilmington, Del., 1950.
"The Atlas HLB System" Atlas Chemical Industries, Inc. Wilmington, Del. 1963.

*Primary Examiner*—Christopher Henderson
*Attorney, Agent, or Firm*—J. D. Brown

[57] ABSTRACT

In an inverse emulsion polymerization system for producing water-soluble polymers from a monomer system comprising an N-vinyl lactam and/or a vinyl-containing sulfonic acid or salt thereof utilizing a surfactant system having (1) a surfactant with a bulky lipophilic portion and a hydrophilic portion and (2) a generally straight-chain monionic surfactant having a lipophilic hydrocarbon group and an OH-terminated hydrophilic group, i.e. an alcohol. Such a system having both the right HLB and the right chemical combination results in a stable emulsion for the polymerization of these particular water-soluble monomers.

6 Claims, No Drawings

SURFACTANT SYSTEM OF POLYETHOXYLATED COMPOUNDS AND GLYCERIDE COMPOUNDS

This application is a divisional of application Ser. No. 251,425 filed Sep. 30, 1988 now U.S. Pat. No. 4,906,701 patented Mar. 6, 1990 which was a continuation-in-part of my application Ser. No. 224,596 filed Jul. 26, 1988 now abandoned which was a divisional application of my application Ser. No. 939,641 filed Dec. 9, 1986 now U.S. Pat. 4,764,574 patented Aug. 16, 1988.

BACKGROUND OF THE INVENTION

In one aspect, this invention relates to a surfactant system which includes a blend of different surfactant compositions. According to another aspect, the invention relates to inverse emulsion polymerization using such a surfactant system.

Conventional emulsion polymerization generally has involved an oil phase finely dispersed in a continuous water phase. However with the production of water-soluble polymers a problem results in that the polymer as it is formed, being water-soluble, dissolves in the continuous water phase and increases the viscosity to an unacceptable extent. If dilute solutions are used, the cost of transportation is prohibitive.

It might seem, then, that the proper approach would be to form the polymer and separate it as a dry solid so that only the polymer has to be transported. However these types of polymers are hard to redissolve in water because the water surrounds the individual particles and swells the outer surface thus forming an "insulation" which greatly slows down the rate at which the polymer goes into solution.

It is known to use an inverse emulsion system wherein water-soluble polymers can be produced in a dispersed water phase within a continuous hydrocarbon phase. Here the polymer formed remains in the dispersed water droplets and does not significantly affect the viscosity of the emulsion. This not only offers an advantage over ordinary emulsions but offers an advantage over forming a dry product. This is because the inverse emulsion is of low viscosity for easy handling and can be quite concentrated for easy transportation. Then at the well site it is easily possible to dilute with a large quantity of water and break the emulsion. Since the polymer is formed in small droplets in the inverse emulsion and is already in solution it easily disperses in the water.

The prior art broadly discloses parameters which can be used to achieve inverse emulsions. U.S. Pat. No. 4,147,681 for instance discloses the use of a relatively high concentration of surfactants having a hydrophilic/lipophilic balance (HLB) of at least 7 to give a stable emulsion which can be inverted by dilution.

Recently, copolymer compositions based on certain monomers have been developed which are particularly suitable for high temperature utility. These polymers have high molecular weight and contain either N-vinyl lactam monomers such as N-vinylpyrrolidone or vinyl-containing sulfonate monomers such as 2-acrylamido-2-methylpropane sulfonic acid or a salt thereof. For these polymers, suitable inverse emulsion polymerization techniques have proven especially difficult. Thus while such monomers are broadly mentioned in the art dealing with inverse emulsions, satisfactory techniques for inverse emulsion polymerization of these monomers to high molecular weight polymers has not heretofore been available.

SUMMARY OF THE INVENTION

It is an object of this invention to provide a stable inverse emulsion polymerization system for at least one ethylenically unsaturated monomer to produce a water-in-oil latex comprising a water-soluble polymer of said at least one ethylenically unsaturated monomer.

It is another object of this invention to provide a stable inverse emulsion polymerization system for monomer compositions comprising an N-vinyl lactam and/or a vinyl-containing sulfonate which monomers are used to make water-soluble polymers; and It is a further object of this invention to provide an improved surfactant composition for inverse emulsion polymerization to produce water-soluble polymers.

The above objects are at least partially realized by a water-in-oil emulsion polymerization process for making water-soluble polymer from at least one ethylenically unsaturated monomer comprising: admixing an aqueous component, at least one organic liquid characterized as substantially immiscible with water, at least one ethylenically unsaturated monomer, at least one polymerization initiator and a surfactant system to form an admixture, wherein the surfactant system is characterized by an HLB number within the range of about 7 to about 9 and comprises (1) a first surfactant composition having at least one surfactant characterized by a lipophilic portion and a hydrophilic portion, the first composition having an HLB of about 7 to about 9; and (2) a second surfactant composition comprising at least one generally straight chain nonionic surfactant having a lipophilic hydrocarbon group and an OH terminated hydrophilic group, the second composition also having an HLB of about 7 to about 9; and subjecting the admixture to polymerization conditions sufficient to produce a water-in-oil latex comprising a water-soluble polymer.

According to another aspect of the invention, a surfactant system is provided which comprises: a first surfactant composition having an HLB of about 7 to about 9 comprising a blend of a sorbitan fatty acid ester and an ethoxylated sorbitan fatty acid ester, as hereinbelow defined; and a second surfactant composition having an HLB of about 7 to about 9 comprising an alkoxylated alcohol.

According to a further aspect of the invention, a surfactant system is provided which comprises: a first surfactant composition having an HLB of about 7 to about 9 comprising a blend of a glyceride and an ethoxylated sorbitol fatty acid ester, as hereinbelow defined; and a second surfactant composition having an HLB of about 7 to about 9 comprising an alkoxylated alcohol.

DESCRIPTION OF THE PREFERRED EMBODIMENTS

A substantial feature of this invention is the discovery that the prior art teachings as to the proper HLB to achieve the desired result are not entirely correct. Actually it is the right chemical type of surfactant composition having the right HLB which must be utilized. Even more unexpectedly, it has been found that for the type of system of this invention there must be a surfactant system of the right HLB made up of two different components each of the right chemical type.

As to the make-up of the surfactant system, the system comprises two different surfactant compositions hereinafter described.

The first surfactant composition comprises at least one surfactant which is characterized by a lipophilic portion and a hydrophilic portion, and which is further characterized by an HLB of about 7 to about 9, most preferably 8 for the most stable emulsion. Although it is within the scope of certain aspects of the invention to use only one surfactant for the first composition, it is usually necessary to use a blend of surfactants to achieve the proper HLB.

One suitable first composition surfactant is a sorbitan fatty acid ester, which as used herein and in the appended claims is a fatty acid ester of sorbitan having the general formula $$C_6H_8O(OH)_{4-n}(R^1COO)_n$$

where $R^1$ is a hydrocarbon group comprising a straight-chain of alkyl groups having 6 to 22 carbon atoms, and where n is an integer of 1 to 3. Such an ester results from the esterification of sorbitan ($C_6H_8O(OH)_4$), also called sorbitol anhydride, with n molecules of a fatty acid (RCOOH) such as lauric acid, stearic acid, oleic acid, etc. $R^1$ can be considered the lipophilic portion and the remainder the hydrophilic portion. Several particularly suitable sorbitan fatty acid esters which are sold under the trademark "Span" by ICI Americans, Inc. are sorbitan monolaurate (Span 20) wherein $R^1$ has 11 carbon atoms and n is 1, sorbitan monopalmitate (Span 40) wherein $R^1$ has 15 carbon atoms and n is 1, sorbitan monostearate (Span 60) wherein $R^1$ has 17 carbon atoms and n is 1, sorbitan tristearate (Span 65) wherein n is 3, sorbitan monooleate (Span 80) wherein $R^1$ has 17 carbon atoms and n is 1, and sorbitan trioleate (Span 85) wherein n is 3. As is well known to those skilled in the art, the compound names are derived from the number and type of RCOO group(s) per molecule. For example, sorbitan monooleate includes one oleate group (oleic acid minus the terminal hydrogen), and thus has the formula $C_6H_8O(OH)_3(C_{17}H_{33}COO)$, or more accurately, $C_6H_8O(OH)_3(CH_3(CH_2)_7CH:CH(CH_2)_7COO)$.

Another particularly suitable first composition surfactant is a polyethoxylated sorbitan fatty acid ester which as used herein and in the appended claims is a polyethoxylated fatty acid ester of sorbitan having the general formula $$C_6H_8O(OH)_{4-n}(OCH_2CH_2)_m(R^1COO)_n$$

where n is an integer from 1 to 3 as above, $R^1$ is defined as above, and m is an integer from 4 to 20 and denotes the number of oxyethylene groups ($OCH_2CH_2$). $R^1$ is generally the lipophilic portion and the remainder the hydrophilic portion. Several suitable compounds which are sold under the trademark "Tween" by ICI Americas, Inc. are the following where the value of m is in parenthesis after "polyoxyethylene": polyoxyethylene (20) sorbitan monolaurate (Tween 20), polyoxyethylene (20) sorbitan monopalmitate (Tween 40), polyoxyethylene (20) sorbitan monostearate (Tween 60), polyoxyethylene (4) sorbitan monostearate (Tween 61), polyoxyethylene (20) sorbitan tristearate (Tween 65), polyoxyethylene (20) sorbitan monooleate (Tween 80), and polyoxyethylene (20) sorbitan trioleate (Tween 85).

Another particularly suitable first composition surfactant is a polyethoxylated sorbitol fatty acid ester which as used herein and in the appended claims is a polyethoxylated fatty acid ester of sorbitol having the general formula $$C_6H_8(OH)_{6-b}(OCH_2CH_2)_m(R^1COO)_b$$

where b is an integer from 1 to 6, $R^1$ is defined as above, and m is an integer from 4 to 60 and denotes the number of oxyethylene groups ($OCH_2CH_2$). $R^1$ is generally the lipophilic portion and the remainder the hydrophilic portion. Some suitable compounds which are sold by ICI Americas, Inc. are the following where the value of m is in parenthesis after "polyoxyethylene": polyoxyethylene (50) sorbitol hexaoleate (G-1096) and polyoxyethylene (40) sorbitol hexaoleate (G-1086).

A further particularly suitable first composition surfactant is a glyceride. Glycerides are known in the art as esters of glycerol and fatty acids in which one or more of the hydroxyl groups of the glycerol have been replaced by acid radicals. Preferred glycerides are the mono- and diglycerides or mixtures thereof. These preferred glycerides can be represented by the general formula:

$$C_3H_5(OH)_{3-q}(R^1COO)_q$$

where $R^1COO$ is the fatty acid moiety, $R^1$ is as previously defined and q is an integer which is 1 or 2. Suitable glycerides can be obtained from natural products (fats and oils) or can be prepared synthetically. Many such products are available commercially. Atmos 300 is a suitable product characterized as a mixture of mono- and diglycerides of fat forming fatty acids available from ICI Americas, Inc.

Sorbitan fatty acid esters and polyethoxylated sorbitan fatty acid esters are the preferred compounds for the first surfactant composition. However to achieve the proper HLB, it is usually necessary to blend such esters. This is because the sorbitan fatty acid esters have low HLB values, predominantly under 8, and polyethoxylated sorbitan fatty acid esters have high HLB values above 9.

Other preferred blends of compounds for the first surfactant composition are combinations of glycerides and polyethoxylated sorbitol fatty acid esters which exhibit the proper HLB values.

Other surfactants can be employed according to certain aspects of the invention for use as the first surfactant composition. One example is a class of compounds called polyethoxy substituted phenols commercially available under the trademark "Triton" from Rohm and Haas Co. Specific examples include polyethoxy octyl phenol (Triton X-15) and polyethoxy nonyl phenol (Triton N). Like the ester compounds discussed above, the polyethoxy substituted phenols are usually blended to achieve the proper HLB.

The second surfactant composition comprises at least one generally straight-chain nonionic surfactant characterized by a lipophilic portion and an OH terminated hydrophilic portion and further being characterized by an HLB of about 7 to about 9, preferably about 8.

Preferably, a straight-chain hydrocarbon group constitutes the lipophilic portion and a straight-chain alkoxy group terminated by an OH group constitutes the hydrophilic portion. Of the general class of such alkoxylated compounds, ethoxylated alcohols are presently preferred as giving the most stable emulsions. Ethoxylated alcohols can be represented by the general formula $$R^2(OCH_2CH_2)_xOH$$

where $R^2$ is a 10 to 30 carbon atom hydrocarbon group, preferably a straight-chain 16–18 atom hydrocarbon group, and x is an integer from 1 to 50, preferably 4. Where $R^2$ has 16–18 carbon atoms and x is 4, this constitutes a polyethoxylated alcohol having an HLB of about 8 available under the trademark "Siponic E-2" from Alcolac, Inc. This compound blended with the first composition has been found to give highly stable emulsions which yield polymers which give desirably high viscosity polymer solutions in brine, especially where a blend of the above described esters is used as the first composition (Span and Tween). Other suitable Siponic polyethoxylated alcohols include polyoxyethylene(2)cetyl alcohol (Siponic C-20) and polyoxyethylene cetyl/stearyl alcohol (Siponic E-10) both of which are usually blended to achieve the proper HLB. Yet other suitable compounds under the ethoxylated alcohol general formula include compounds sold under the trademark "Brij" by ICI Americas, Inc., such as Brij 72 ($R^2$ has 18 carbons, and x is 2) and Brij 78 ($R^2$ has 18 carbons and x is 20) which also must normally be blended to achieve the proper HLB.

Other alkoxylated compounds suitable for use for the second surfactant composition are ethoxylated fatty acids sold under the trademark "Pegosperse" by Glyco Chemicals, Inc. and ethoxylated amines.

Suitable initiators for inverse polymerization include azo compounds such as 2,2'-azobisisobutyronitrile (commercially available as Vazo-64® from E. I. DuPont), 2-t-butylazo-2-cyanopropane, 2,2'-azobis(2,4-dimethylvaleronitrile) (Vazo-52® from E. I. DuPont), 2,2'-azobis(2-amidinopropane) hydrochloride (V-50 from Wako), 2-t-butylazo-2-cyanopropane, 2-t-butylazo-2-cyanobutane, 2-t-butylazo-1-cyanocyclohexane, 2-t-butylazo-2-cyano-4-methoxy-4-methyl-pentane (commercially available as Luazo® 55 from Lucidol Div., Pennwalt Corp.), hyponitrites such as t-butyl hyponitrite and t-amyl hyponitrite 2-t-butylazo-2-cyano-4-methylpentane (Luazo® 70, available from same source), 4,4'-azobis(4-cyanovaleric acid), 4-t-butylazo-4-cyanovaleric acid and the like. A particularly suitable lower temperature azo initiator is 2,2'-azobis(2,4-dimethyl-4-methoxy-valeronitrile) commercially available as Vazo 33 from E. I. DuPont.

Other suitable initiators include organic peroxide compounds such as benzoyl peroxide, di-t-butyl peroxide, t-butyl peroxyacetate. A particularly suitable peroxide initiator because of its effectiveness at low temperatures is p-menthane hydroperoxide activated by $FeSO_4.7H_2O$ complexed with tetrasodium salt of ethylene diamine tetracetic acid and reduced with sodium formaldehyde sulfoxylate.

Of the above initiators, the azo compounds are presently preferred for most applications, as some peroxides appear to have a tendency to adversely affect the polymer; however, some peroxides are effective at lower temperatures than those at which most azo compounds are useful. It should be understood that compounds, such as persulfates, other than azo and peroxide compounds can be used as initiators.

A thiol compound can be added to the inverse emulsion polymerization system as a chain transfer agent, if so desired, to provide a means of reducing the molecular weight of the polymer produced therein. For certain applications, water-in-oil latexes comprising water-soluble polymers of reduced molecular weight are more suitable than the high molecular weight polymer latexes. A preferred group of thiol compounds for use in this manner is represented by the general formula HS-Y(Z)p, wherein Y is a hydrocarbyl radical having 2–5 carbon atoms and a valence of p+1; Z is selected from the group consisting of —OH, —$CO_2H$, and —$CO_2R^8$ wherein $R^8$ is an alkyl radical of 1–3 carbon atoms; p is an integer of 1 or 2; and wherein the total number of carbon atoms per molecule of said thiol is 2–7. Examples of suitable preferred thiol compounds include 2-mercaptoethanol, mercaptoacetic acid, methyl 3-mercaptopropionate, 3-mercaptopropionic acid, 3-mercapto-1-propanol, 3-mercapto-1,2-propanediol, mercaptosuccinic acid, propyl mercaptoacetate, ethyl mercaptoacetate, methyl mercaptoacetate, and dimethyl 2-mercaptomalonate. When utilized, the amount of thiol compound employed will be about 0.00007 to about 0.07, preferably about 0.00009 to about 0.05, and more preferably about 0.00013 to about 0.03, parts by weight per 100 parts by weight of the total polymerization mixture.

Any suitable temperature can be used as for instance from $-10°$ to 100° C. and in fact even temperatures above 100° C. can be used if pressure is utilized to prevent vaporization of the water. Thus broadly any temperature from the freezing point to the boiling point of water under the conditions used can be employed. Preferably, however, relatively low temperatures are preferred, i.e. from 1° to 10°0 C.

Polymerization times are the same as those conventionally used in the art, generally 2 to 18 hours and preferably 2 to 6 hours, although as little as one-half hour could be used. However, attempting more rapid polymerization over a shorter period of time creates problems with removing heat. In this regard it is greatly preferred that the polymerization medium be stirred well or otherwise agitated during the polymerization.

The equipment utilized for the polymerization can simply be standard reactors such as are used for oil-in-water emulsion polymerizations.

With regard to charge order, it is preferred that the water-soluble ingredients including the monomers be mixed together and that the surfactant compositions be mixed with the oil, and thereafter the two mixtures combined. If a thiol compound is employed, it is usually added after the two mixtures are combined. The water is generally either distilled or deionized water.

The initiator is not generally added until after the other ingredients are all combined.

The water is generally present in an amount within the range of 50 to 200 parts by weight per 100 parts by weight of monomer(s) with about 80 to 120 parts by weight being preferred. In the case of one particular monomer combination, N-vinylpyrrolidone/2-acrylamido-2-methylpropane sulfonate, sodium salt, the preferred concentration is about 100 to 120 parts by weight of water and most preferably about 110.

Any suitable inert organic liquid which is substantially immiscible with water can be employed as the oil phase in preparing the water-in-oil emulsions and latexes according to this invention. It is preferred that this organic liquid, which is substantially immiscible with water, be a liquid hydrocarbon or a mixture of liquid hydrocarbons. More preferably, the oil phase will comprise liquid paraffinic or isoparaffinic hydrocarbons and mixtures of such hydrocarbons. An example of a more preferred oil phase is a hydrocarbon such as that sold under the trademark "Soltrol 145" hydrocarbon. This component is generally present in an amount within the range of 60 to 120 parts by weight per 100 parts by weight of monomer(s), most preferably about 80 to 100 parts. With the specific monomer combination of vinylpyrrolidone and 2-acrylamido-2-methylpropane sulfonate, sodium salt, the preferred concentration is about 80 to 100 with about 90 parts by weight per 100 parts by weight of monomer(s) being most preferred.

In the case of the preferred surfactant components, Span 80 is present in an amount of about 9 parts by weight, Tween 85 in an amount of about 11 parts by weight and Siponic E-2 in an amount of about 12 parts by weight based on 100 parts by weight of monomer(s), there being very little leeway in these matters since with regard to the Span 80 and Tween 85 they must be present in the right proportions to give the correct HLB. The second composition of the surfactant system such as the Siponic E-2 can be viewed as being present in an amount sufficient so as to give the best emulsion. In another example of preferred surfactant components, Atmos 300 is present in an amount of about 4 parts by weight, G1096 is present in an amount of about 6 parts by weight, and Siponic E-2 in an amount of about 6 parts by weight based on 100 parts by weight of monomer(s). As before, the second composition of the surfactant system such as Siponic E-2 can be viewed as being present in an amount sufficient so as to give the best emulsion.

When para-menthane hydroperoxide is used as the initiator it is generally present in an amount within the range of 0.0125 to 0.05, preferably about 0.025, parts by weight per hundred parts by weight of monomer(s), with the iron compound being present in an amount within the range of about 0.000005 to 0.001, preferably about 0.00002, parts by weight per hundred parts by weight of monomer(s). The ethylene diamine tetracetic acid sodium salt with 4 molecules of water of hydration is generally present in an amount of about 0.00006 parts by weight. The reductant sodium formaldehyde sulfoxylate is generally present in the amount of 0.01 to 0.04, preferably about 0.02 parts by weight per hundred parts by weight of monomer(s). Broadly, 0.01 to 1.0 weight per cent initiator based on monomers can be used.

After the polymerization has run its desired course a shortstop may be added such as "Thiostop N" which is a 40 percent sodium dimethyl dithio carbamate solution. It can be added in an amount in the range of 0.2 to 0.8, preferably about 0.4, parts by weight per 100 parts by weight of monomer(s).

With respect to the monomers, the N-vinyl lactam monomers can be depicted by the formula:

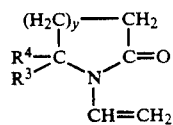

where $R^3$ and $R^4$ are selected independently from the group consisting of hydrogen, methyl and ethyl and y is an integer of from 1 to 3. These monomers are generally water-soluble or water-dispersible. A more preferred class of compounds are those of the formula

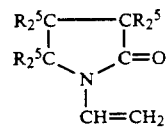

where $R^5$ is hydrogen, methyl or ethyl. The N-vinyl lactam monomer presently most preferred is N-vinyl-2-pyrrolidone (VP).

The vinyl-containing sulfonate monomer which is meant to encompass the acid also is represented by the following formula

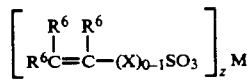

where $R^6$ is methyl, ethyl or H, preferably methyl or H, and provided further that at least one of the $R^6$ groups on the terminal carbon of the vinyl group is H and the other is H or methyl.

M is $H^+$, $Na^+$, $K^+$, $Li^+$, $Ca^{++}$ or $Mg^{++}$, and z is an integer equal to the valence of M.

X is

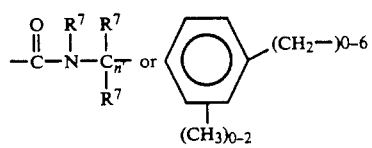

where n' is an integer of 1–5 preferably 1–3 and $R^7$ is a 1–3 carbon atom alkyl group or H.

Examples of suitable vinyl-containing sulfonate compounds are:

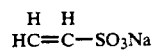

vinyl sulfonate, sodium salt;

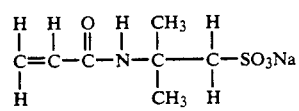

sodium 2-acrylamido-2-methylpropane sulfonate (sodium AMPS);

styrene sulfonate, sodium salt;

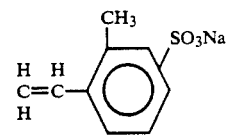

sodium vinyl toluene sulfonate;

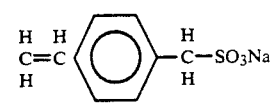

sodium p-vinylbenzyl sulfonate.

These are known monomers and can be produced as is known in the art. Particularly with regard to the N-sulfohydrocarbon-substituted acrylamides, they are disclosed in U.S. Pat. No. 3,679,000 assigned to the Lubrizol Corporation, the disclosure of which patent is incorporated by reference. The 2-acrylamido-2-methylpropane sulfonic acid is available from Lubrizol under the designation AMPS.

There can be used in place of, or in addition to, the vinyl containing sulfonate, an ester of the formula:

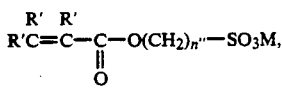

where R' is methyl, ethyl or H, preferably methyl or H, and further provided that at least one of the R' groups on the terminal carbon is H and the other is H or methyl, and where n" is 1 to 20, i.e. compounds such as (3-sulfo-n-propyl)methacrylic ester, potassium salt.

The inverse emulsion polymerization system of this invention can be used to prepare copolymers of the N-vinyl lactam and the vinyl containing sulfonate or copolymers of either one with an unsaturated amide such as acrylamide (AM) or terpolymers, i.e. VP/AM/AMPS.

The unsaturated amide monomers referred to hereinabove have the formula

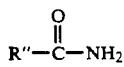

where R" is an unsaturated radical selected from the group ethenyl (vinyl), propenyl, isopropenyl, 1-butenyl, isobutenyl (2-methyl-2-propenyl), 1-pentenyl, 1-isopentenyl (3-methyl-t-butenyl), and 1-methyl-1-butenyl. These unsaturated amides are generally water-soluble or water dispersible.

A more preferred class of unsaturated amide monomers are those of the formula

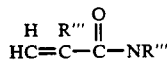

wherein each R''' is individually selected from H and methyl. Especially suitable in addition to acrylamide are N-methylacrylamide and N,N-dimethylacrylamide (DMAM). For both the vinyl lactam and unsaturated amide the scope can be viewed functionally as including the replacement of hydrogens with hydrocarbon groups so long as the monomer remains hydrophilic. By hydrophilic is meant if the monomer were homopolymerized, the polymer would be water soluble.

Other suitable monomers useable with monomers discussed above are unsaturated organic acid monomers such as acrylic acid and methacrylic acid, and also water soluble esters of such unsaturated organic acids.

The monomer weight ratios can vary widely. Generally the copolymers will have weight ratios of 10:90 to 90:10 with the vinyl lactam/unsaturated amide copolymers generally having ratios within the range of 25:75 to 75:25, preferably 40:60 to 70:30 of lactam:amide.

Similar weight ratios can be utilized for the lactam/vinyl containing sulfonate copolymers. However, with the particular system of VP/AMPS, ratios of about 10:90 are particularly desirable.

Monomer ratios for vinyl containing sulfonate and unsaturated amide can be the same as those set out hereinabove for the N-vinyl lactam/unsaturated amide.

Terpolymer compositions can vary widely in composition but generally will contain 20 to 40 weight percent N-vinyl lactam, 10 to 20 weight percent unsaturated amide and 40 to 65 weight percent of vinyl containing sulfonate, a 30:15:55 VP:AM:NaAMPS being particularly suitable.

EXAMPLE I

Screening tests were conducted with the following recipe in order to determine a suitable HLB range for the surfactant system employed in preparing the water-in-oil (inverse) emulsion of a N-vinyl pyrrolidone/acrylamide (VP/AM) (50/50) copolymer. The tests were made by preparing the emulsions (¼ recipe in grams) at room temperature and then simply making visual observations on the stability of the emulsions as judged by their tendency to form layers on separation of the phases. The monomers were not polymerized in these screening tests.

| Recipe | |
|---|---|
| | Parts, by wt |
| VP | 50 |
| AM | 50 |
| Water | 100 |
| Hydrocarbon[a] | 100 |
| Surfactant[b] | 20 |

[a]Three different hydrocarbon phases were employed: isopentane, isoparaffinic solvent (Soltrol 145 from Phillips Petroleum Co.) and a 50/50 by wt blend of isopentane and Soltrol 145.
[b]Surfactants were obtained from a test kit supplied by Atlas Chemical Industries (Atlab HLB Series). HLB values of 2, 4, 6, 8, 10, 12 and 14 were used in the screening tests.

The emulsions were prepared by dissolving the monomers in water, dissolving the surfactant in the hydrocarbon phase then vigorously mixing the two solutions in glass test tubes.

The results showed that for each of the three hydrocarbon phases employed the most stable emulsions appeared to be formed when the HLB value of the surfactant was 8.

EXAMPLE II

Additional screening tests were conducted in a manner similar to that used in Example I. The inverse emulsion recipe used in these tests is shown below.

| Recipe | |
|---|---|
| | Parts, by wt |
| VP | 50 |
| AM | 50 |
| Water | 100 |
| Hydrocarbon[a] | 300 |
| Surfactant | 20 |

[a]A 50/50 by wt blend of isopentane and Soltrol 145.

A variety of commercially available surfactants and blends thereof were screened with HLB values near 8.

A listing of the surfactants used and the corresponding HLB values are shown in the Table I below.

TABLE I

| Run No. | Surfactant | | HLB |
|---|---|---|---|
| | Name | Composition (Ratio) | |
| 1 | Triton X35 | Polyethoxy octyl phenol | 7.8 |

TABLE I-continued

| Run No. | Surfactant Name | Composition (Ratio) | HLB |
|---|---|---|---|
| 2 | Siponic TD-3 | Polyoxyethylene (3) tridecyl alcohol | 7.9 |
| 3 | Span 20 | Sorbitan monolaurate | 8.6 |
| 4 | Span 40 | Sorbitan monopalmitate | 6.7 |
| 5 | Siponic C-20/ Siponic E-10 | Polyoxyethylene (2) cetyl alcohol/ Polyoxyethylene (20) cetyl/stearyl alcohol (83/17) | 7 |
| 6 | Span 85/ Tween 85 | Sorbitan trioleate/ Polyoxyethylene (20) sorbitan trioleate (43/57) | 7 |
| 7 | Span 65/ Tween 65 | Sorbitan tristearate/ Polyoxyethylene (20) sorbitan tristearate (42/58) | 7 |
| 8 | Span 80/ Tween 80 | Sorbitan monooleate/ Polyoxyethylene (20) sorbitan monooleate (75/25) | 7 |
| 9 | Brij 52/ Brij 58 | Polyoxyethylene (2) cetyl ether/ Polyoxyethylene (20) cetyl ether (84/15) | 7 |
| 10 | Brij 72/ Brij 78 | Polyoxyethylene (2) stearyl ether/ Polyoxyethylene (20) stearyl ether (80/20) | 7 |
| 11 | Span 60/ Tween 60 | Sorbitan monostearate/ Polyoxyethylene (20) sorbitan monostearate (77/23) | 7 |
| 12 | Span 60/ Tween 61 | Sorbitan monostearate/ Polyoxyethylene (4) sorbitan monostearate (53/47) | 7 |

Suppliers are as noted previously: Triton from Rohm and Haas Co.; Siponic from Alcolac, Inc.; Span, Tween and Brij from ICI Americas, Inc. Observations on the emulsions indicated that Runs 5 and 12 were the most stable in this series of tests.

EXAMPLE III

Based on the screening test results of Example II, VP/AM (50/50) copolymerization runs were made with the surfactant blends of Runs 5 and 12 but at three different ratios to obtain HLB values of 6, 7 and 8. The recipe employed in these runs is shown below. The polymerizations were conducted at 50° C. with ¼ recipe in grams per run.

| Recipe | Parts, by wt |
|---|---|
| VP | 50 |
| AM | 50 |
| Water | 110 |
| Isopentane/Soltrol 145 (50/50) | 300 |
| Surfactant | 20 |
| Initiator - $K_2S_2O_8$[a] | 0.3 |

[a]The $K_2S_2O_8$ was added with 10 parts $H_2O$ as an aqueous solution.

Charge order: VP and AM were dissolved in water, surfactants were dissolved in the hydrocarbons and the two solutions mixed in beverage bottles which served as the polymerization reactors. Initiator solution was then charged to each bottle to start the polymerization. Table II presents further details for the runs and certain of the results obtained.

TABLE II

| Run No. | HLB | Surfactant[a] Wt Ratio | Time, hr. | Observations |
|---|---|---|---|---|
| 1 | 6 | 93/7 | 1 | Slight separation[b] |
| 2 | 7 | 83/17 | 1 | " |
| 3 | 8 | 73/27 | 1 | " |
| 4 | 6 | 73/27 | 17 | Slight separation[c] |
| 5 | 7 | 53/47 | 17 | " |
| 6 | 8 | 33/67 | 17 | " |

[a]In Runs 1-3 the surfactant was a Siponic C-20/Siponic E-10 blend, while in Runs 4-6 it was a Span 60/Tween 61 blend.
[b]The slight separation appeared towards the bottom of the reaction mixture.
[c]The slight separation appeared towards the top of the reaction mixture.

Solids measurements and Brookfield viscosities were obtained on diluted inverse emulsions produced in Runs 4-6. The results are shown in Table III.

TABLE III

| Run No. | Solids % | Conversion[a] % | Brookfield[b] Viscosity, cp |
|---|---|---|---|
| 4 | 22.7 | 100 | 1.6 |
| 5 | 22.4 | 99 | 1.6 |
| 6 | 21.5 | 95 | 1.5 |

[a]Calculated, based on a theoretical solids of 22.6% for 100% conversion to polymer.
[b]LVT model viscometer, @ 25° C. 6 rpm, ultra low spindle, 0.25 wt % polymer in deionized water.

The results in Tables II and III show that adequate polymerizations were obtained but that improvement in emulsion stability and molecular weight are still needed to be achieved with the two-component surfactant blends tested. Note in particular in Table II that the emulsions were unstable even when the surfactant blends (Siponic C-20/Siponic E-10 and Span 60/Tween 61) had an HLB of 8, which was found previously to be the optimum HLB with respect to emulsion stability.

EXAMPLE IV

Further runs were made to examine the effect of an added third surfactant to certain two component surfactant blends used in preparing inverse emulsions of the VP/AM (50/50) copolymer. The recipe used in these runs is shown below. The polymerizations were conducted at 50° C.

| Recipe | Parts, by wt |
|---|---|
| VP | 50 |
| AM (50% aq. solution) | 100 |
| Water | 50 |
| Soltrol 145 | 100 |
| Surfactant | variable |
| Initiator, AIBN[a] | 0.05 |

[a]AIBN is 2,2'-azo-bis-isobutyronitrile. It was charged as a solution in VP, 5% by wt.

Charge order (¼ recipe in grams per run): AM, VP, $H_2O$, and Soltrol having surfactant dissolved therein were mixed. Each mixture was poured into a 10 oz bottle. The contents were purged 25-30 minutes with $N_2$ and the bottle capped with a perforated crown cap having a self-sealing rubber liner. The initiator was then charged to each bottle through the cap by means of a hypodermic syringe and needle. Each bottle was then placed in a 50° C. polymerization bath.

The effect of the surfactants on emulsion stability prior to initiation was observed by adding increasing amounts of Siponic E-2 to reaction mixtures already having a fixed (5 g) amount of a surfactant blend. The amount of Siponic E-2 needed to give a visibly stable emulsion was noted for each surfactant blend. In effect, a "titration" of the reaction mixture to a point of emulsion stability was performed.

The surfactant blends used and the results obtained are shown below in Tables IV and V, respectively.

TABLE IV

| Run No. | Surfactant Blend, (g/g) | Siponic E-2 g | Total phm[b] | Observations |
|---|---|---|---|---|
| 1 | Triton X-15/Triton X-100[a] (2.78/2.22) | 0 | 20 | unstable |
| 2 | Triton X-15/Triton X-100[a] (2.78/2.22) | 1 | 24 | " |
| 3 | Triton X-15/Triton X-100[a] (2.78/2.22) | 2 | 28 | " |
| 4 | Triton X-15/Triton X-100[a] (2.78/2.22) | 3 | 32 | " |
| 5 | Triton X-15/Triton X-100[a] (2.78/2.22) | 4 | 36 | " |
| 6 | Triton X-15/Triton X-100[a] (2.78/2.22) | 5 | 40 | stable |
| 7 | Span 60/Tween 61 (1.64/3.36) | 0 | 20 | unstable |
| 8 | Span 60/Tween 61 (1.64/3.36) | 1 | 24 | " |
| 9 | Span 60/Tween 61 (1.64/3.36) | 2 | 28 | stable |
| 10 | Span 60/Tween 60 (3.38/1.62) | 0 | 20 | unstable |
| 11 | Span 60/Tween 60 (3.38/1.62) | 1 | 24 | " |
| 12 | Span 60/Tween 60 (3.38/1.62) | 2 | 28 | " |
| 13 | Span 60/Tween 60 (3.38/1.62) | 3 | 32 | stable |
| 14 | Span 60/Tween 65 (2.16/2.84) | 0 | 20 | unstable |
| 15 | Span 60/Tween 65 (2.16/2.84) | 1 | 24 | " |
| 16 | Span 60/Tween 65 (2.16/2.84) | 2 | 28 | " |
| 17 | Span 60/Tween 65 (2.16/2.84) | 3 | 32 | stable |

[a]Triton X-15 and Triton X-100 are polyethoxy (1 and 10 resp.) octyl phenols from Rohm and Haas Co.
[b]Parts by wt per 100 parts by wt of monomer(s).

Each of the surfactant blends as well as Siponic E-2 have an HLB of about 8.

Conversion data and viscosity measurements were obtained for Runs 6, 9, 13 and 17 and these results are shown in Table V.

TABLE V

| Run No. | Conversion, % @ 6 hr | 23 hr | 71 hr | Brookfield[a] Viscosity, cp | Inherent[b] Viscosity |
|---|---|---|---|---|---|
| 6 | 44 | 53 | 87 | 2.4 | 2.33 |
| 9 | 64 | 74 | 118 | 2.9 | 3.92 |
| 13 | 74 | 102 | — | 4.6 | 4.29 |
| 17 | 74 | 97 | — | 3.0 | 3.67 |

[a]LVT model viscometer, spindle UL, 6 rpm, @ 25° C., using 0.25 wt % polymer solutions in a brine, (Synthetic North Sea Water) SNSW made by diluting the emulsions with SNSW with thorough mixing.
[b]Determined at 25° C. with 0.25 wt % polymer solutions in SNSW made as described above.

The results show that stable emulsions which give high viscosity polymer solutions in a brine can be obtained with a three component surfactant system of the Span/Tween/Siponic E-2 type. The results with the surfactant system of Run 6 using a Triton surfactant blend were not as satisfactory.

EXAMPLE V

Another series of runs were made using the same recipe and essentially the same procedures as in Example IV and the same surfactant components as in Example IV but the amounts were reduced about 50%. A further difference was the use of acetone as a solvent for the AIBN initiator rather than the monomer VP. Table VI below shows the amounts or surfactants used and the observations on emulsion stability prior to initiation.

TABLE VI

| Run No. | Surfactant Blend, (g/g) | Siponic E-2 g | Total phm | Observations |
|---|---|---|---|---|
| 1 | Triton X-15/Triton X-100 (1.39/1.11) | 0 | 9.9 | unstable |
| 2 | Triton X-15/Triton X-100 (1.39/1.11) | 0.5 | 11.9 | " |
| 3 | Triton X-15/Triton X-100 (1.39/1.11) | 1.0 | 13.9 | " |
| 4 | Triton X-15/Triton X-100 (1.39/1.11) | 1.5 | 15.9 | " |
| 5 | Triton X-15/Triton X-100 (1.39/1.11) | 2.0 | 17.9 | stable |
| 6 | Span 60/Tween 61 (0.82/1.68) | 0 | 10 | unstable |
| 7 | Span 60/Tween 61 (0.82/1.68) | 0.5 | 12 | " |
| 8 | Span 60/Tween 61 (0.82/1.68) | 1.0 | 14 | " |
| 9 | Span 60/Tween 61 (0.82/1.68) | 1.5 | 16 | stable |
| 10 | Span 60/Tween 60 (1.69/0.81) | 0 | 10 | unstable |
| 11 | Span 60/Tween 60 (1.69/0.81) | 0.5 | 12 | " |
| 12 | Span 60/Tween 60 (1.69/0.81) | 1.0 | 14 | stable |
| 13 | Span 60/Tween 65 (1.08/1.42) | 0 | 10 | unstable |
| 14 | Span 60/Tween 65 (1.08/1.42) | 0.5 | 12 | " |
| 15 | Span 60/Tween 65 (1.08/1.42) | 1.0 | 14 | " |
| 16 | Span 60/Tween 65 (1.08/1.42) | 1.5 | 16 | stable |

Runs 5, 9, 12 and 16 were charged with initiator for polymerization at 50° C. but each emulsion destabilized during polymerization so that no conversion data and viscosity measurements were obtained. The results of Examples IV and V indicate that at least about 25–28 phm of total surfactant is needed for stable inverse emulsion polymerization of VP/AM at 50° C. with an azo initiator using a Span/Tween/Siponic E-2 surfactant blend.

EXAMPLE VI

Further runs were conducted using the recipe of Example IV and essentially the same procedures as in Examples IV and V with the exception that the "titrating" surfactant component Siponic E-2 was replaced by a blend of two surfactants Brij 72/Brij 78 at a wt ratio of 70.2/29.8 (HLB 8) in the Brij blend. As in Example V the AIBN initiator was charged as a solution in acetone for polymerization at 50° C.

The surfactant blends employed and observations on inverse emulsion stability prior to initiation are presented in Table VII below.

TABLE VII

| Run No. | Surfactant Blend, (g/g) | B72/B78[a] g | Total phm | Observations |
|---|---|---|---|---|
| 1 | Triton X-15/Triton X-100 (2/78/2.22) | 0 | 20 | unstable |
| 2 | Triton X-15/Triton X-100 (2/78/2.22) | 1 | 24 | " |
| 3 | Triton X-15/Triton X-100 (2/78/2.22) | 2 | 28 | " |
| 4 | Triton X-15/Triton X-100 (2/78/2.22) | 3 | 32 | " |

TABLE VII-continued

| Run No. | Surfactant Blend, (g/g) | B72/B78[a] g | Total phm | Observations |
|---|---|---|---|---|
| 5 | Triton X-15/Triton X-100 (2/78/2.22) | 4 | 36 | " |
| 6 | Triton X-15/Triton X-100 (2/78/2.22) | 8[b] | 52 | stable |
| 7 | Span 60/Tween 61 (1.64/3.36) | 0 | 20 | unstable |
| 8 | Span 60/Tween 61 (1.64/3.36) | 1 | 24 | " |
| 9 | Span 60/Tween 61 (1.64/3.36) | 2 | 28 | " |
| 10 | Span 60/Tween 61 (1.64/3.36) | 3 | 32 | stable |
| 11 | Span 60/Tween 60 (3.38/1.62) | 0 | 20 | unstable |
| 12 | Span 60/Tween 60 (3.38/1.62) | 1 | 24 | " |
| 13 | Span 60/Tween 60 (3.38/1.62) | 2 | 28 | " |
| 14 | Span 60/Tween 60 (3.38/1.62) | 3 | 32 | stable |
| 15 | Span 60/Tween 65 (2.16/2.84) | 0 | 20 | unstable |
| 16 | Span 60/Tween 65 (2.16/2.84) | 1 | 24 | " |
| 17 | Span 60/Tween 65 (2.16/2.84) | 2 | 28 | " |
| 18 | Span 60/Tween 65 (2.16/2.84) | 3 | 32 | stable |

[a]B72/B78 is the 70.2/29.8 wt ratio blend of Brij 72/Brij 78.
[b]This run required three successive 1 g additions beyond 5 g to reach stability.

Runs 6, 10, 14 and 18 were polymerized as described. The conversion results and viscosity measurements obtained are presented in Table VIII.

TABLE VIII

| Run No. | Conversion, % @ 17 hr | 23 hr | 71 hr | Brookfield[a] Viscosity, cp | Inherent[b] Viscosity |
|---|---|---|---|---|---|
| 6 | 35 | 59 | 117 | 2.9 | 3.44 |
| 10 | 93 | 102 | — | 3.8 | 3.85 |
| 14 | 16 | 17 | 105 | 3.1 | 3.79 |
| 18 | 90 | 96 | — | 4.0 | 3.85 |

[a]See footnote a Table V.
[b]See footnote b Table V.

Runs 10 and 18 appeared to give adequate polymerization behavior and reasonably good viscosity values. However, the results in general were not as good as those of Example IV using Siponic E-2 as a surfactant component. Moreover, one less surfactant component is utilized in the runs of Example IV than the runs of this example thus reducing the complexity of the system.

EXAMPLE VII

In order to simplify inverse emulsion (of VP/AM copolymer) evaluation and provide a closer correlation of viscosity results with a possible end use application, it was desired to use a brine (Synthetic North Sea Water-SNSW) as a substantial portion of the aqueous phase in the preparation of the inverse emulsions of VP/AM (50/50) copolymer. Screening tests showed that a Span/Tween/Siponic E-2 surfactant blend (at about 24 phm total) could provide visibly stable emulsions at room temperature using the recipe shown in Example IV wherein 50 parts of water was replaced by 50 parts of SNSW.

Polymerization runs then were made using the recipe shown below at a temperature of 50° C. using substantially the same procedures as in Examples IV-VI.

| Recipe | Parts, by wt |
|---|---|
| VP | 50 |
| AM (50% aq. solution) | 100 |
| SNSW | 50 |
| Soltrol 145 | 100 |
| Surfactant | variable |
| AIBN[a] | 0.25 |

[a]Charged as a solution in acetone, 0.5% by wt.

The surfactant systems used in these runs are shown in Table IX with observations on emulsion stability.

TABLE IX

| Run No. | Surfactant Blend, (g/g) | Add'l Surf., g | Total phm[b] | Observations |
|---|---|---|---|---|
| 1 | Triton X-15/Triton X-100 (2.78/2.22) | 5a | 40 | unstable |
| 2 | Triton X-15/Triton X-100 (2.78/2.22) | 5[b] | 40 | unstable |
| 3 | Span 60/Tween 61 (1.64/3.36) | 1[a] | 24 | stable |
| 4 | Span 60/Tween 61 (1.64/3.36) | 1[b] | 24 | stable |
| 5 | Span 60/Tween 60 (3.38/1.62) | 1[a] | 24 | stable |
| 6 | Span 60/Tween 60 (3.38/1.62) | 1[b] | 24 | stable |
| 7 | Span 60/Tween 65 (2.16/2.84) | 1[a] | 24 | stable[c] |
| 8 | Span 60/Tween 65 (2.16/2.84) | 1[b] | 24 | stable |

[a]The added surfactant was Siponic E-2.
[b]The added surfactant was a blend of Brij 72/Brij 78 at a 70.2/29.8 wt ratio.
[c]In this run phase separation occurred during polymerization.

Conversion data and viscosity results were not obtained for runs 1 and 2. The results obtained in runs 3-8 are shown in Table X.

TABLE X

| Run No. | Conversion, % @ 20 hr | Brookfield[a] Viscosity, cp | Inherent[b] Viscosity |
|---|---|---|---|
| 3 | 83 | —[c] | —[c] |
| 4 | 96 | 4.2 | 4.88 |
| 5 | 80 | —[c] | —[c] |
| 6 | 103 | 3.5 | 4.45 |
| 7 | 99 | 4.3 | 5.13 |
| 8 | 94 | 4.4 | 5.12 |

[a]See footnote a Table V.
[b]See footnote b Table V.
[c]Not determined.

The results show that reasonably good conversions and viscosity values can be obtained in the presence of a brine, SNSW, during the polymerization of VP/AM in an inverse emulsion system.

EXAMPLE VIII

Other polymerization runs were conducted employing the recipe shown in Example IV at 50° C. for about 18 hours. These runs utilized a different group of surfactants each at a total PHM of 20 as shown below in Table XI.

TABLE XI

| Run No. | Surfactant, (g) | | HLB |
|---|---|---|---|
| 1 | Pegosperse 100-ML[a]/Pegosperse 400-DL[b] | (2.5/2.5) | 8.0 |
| 2 | Pegosperse 100-O[c]/Pegosperse 400-DL[b] | (1.67/3.33) | 7.8 |
| 3 | Pegosperse 400-DO[d] | (5) | 7.2 |

TABLE XI-continued

| Run No. | Surfactant, (g) | | HLB |
|---|---|---|---|
| 4 | Pegosperse 400-DS[e] | (5) | 7.8 |
| 5 | Pegosperse 100-ML[a] | (5) | 6.0 |
| 6 | Pegosperse 400-DL[b] | (5) | 10.0 |

Unfortunately, each run destabilized during polymerization so that no conversion data or viscosity results could be obtained.
[a]Pegosperse 100-ML is polyethyleneglycol (PEG) (100) monolaurate.
[b]Pegosperse 400-DL is PEG (400) dilaurate.
[c]Pegosperse 100-O is PEG (100) monoleate.
[d]Pegosperse 400-DO is PEG (400) dioleate.
[e]Pegosperse 400-DS is PEG (400) distearate.

The Pegosperse surfactants are supplied by Glyco Chemicals, Inc.

EXAMPLE IX

Further runs were conducted at 50° C. using the recipe of Example IV except that several different mineral oils were used instead of Soltrol 145 and a variety of surfactant systems were employed. The particular combinations of mineral oil and surfactants used as shown in Table XII.

TABLE XII

| Run No. | Oil Name | Surfactant Blend, (g/g) | Siponic E-2 g | Total phm |
|---|---|---|---|---|
| 1 | Parol 100 | Triton X-15/Triton X-100 (2.78/2.22) | 5 | 40 |
| 2 | | Span 60/Tween 60 (3.38/1.62) | 2 | 28 |
| 3 | | Span 60/Tween 61 (1.64/3.36) | 2 | 28 |
| 4 | | Span 80/Tween 80 (3.27/1.73) | 5 | 40 |
| 5 | Parol 70 | Triton X-15/Triton X-100 (2.78/2.22) | 5 | 40 |
| 6 | | Span 60/Tween 60 (3.38/1.62) | 2 | 28 |
| 7 | | Span 60/Tween 61 (1.64/3.36) | 4 | 28 |
| 8 | | Span 80/Tween 80 (3.27/1.73) | 5 | 40 |
| 9 | Oil 2257 | Triton X-15/Triton X-100 (2.78/2.22) | 5 | 40 |
| 10 | | Span 60/Tween 60 (3.38/1.62) | 1 | 24 |
| 11 | | Span 60/Tween 61 (1.64/3.36) | 1 | 24 |
| 12 | | Span 80/Tween 80 (3.27/1.73) | 4 | 36 |

Conversion data was obtained for Runs 8, 10, 11 and 12 but all the other runs were too severely destabilized during polymerization. The conversion data was as follows:

| Run | Conversion % @ hr. |
|---|---|
| 8 | 85 @ 72 hr |
| 10 | 81 @ about 18 hr. |
| 11 | 81 @ about 18 hr. |
| 12 | 84 @ about 18 hr. |

No viscosity measurements were made.

These results suggest that Soltrol 145 is more effective than the mineral oils in providing a stable inverse emulsion.

Parol 100, Parol 70 and oil 2257 are white mineral type oils obtained from Penreco of Butler, Pa.

EXAMPLE X

Polymerization runs were conducted using the recipe shown below at 30° C.

| Recipe | Parts, by wt |
|---|---|
| VP | 60 |
| AM (50% aq. solution) | 80 |
| SNSW | 60 |
| Soltrol 145 | 100 |
| Surfactant | 40 |
| Vazo 33[a] | 0.1 |

[a]Charged as a solution (0.05 g/mL) in VP.

Charge Order (¼ recipe in grams): AM and VP were dissolved in SNSW. A separate solution of the surfactant components (Span and Tween) dissolved in Soltrol 145 was prepared. The solutions were mixed thoroughly and Siponic E-2 added ("titrated") to provide a visibly stable emulsion.

The surfactants employed are shown in Table XIII below.

TABLE XIII

| Run No. | Surfactants (g/g) | | Siponic E-2 g |
|---|---|---|---|
| 1 | Span 80/Tween 80 | (3.27/1.73) | 5 |
| 2 | Span 80/Tween 85 | (2.24/2.76) | 5 |
| 3 | Span 85/Tween 80 | (2.65/2.35) | 5 |
| 4 | Span 85/Tween 85 | (1.67/3.37) | 5 |

An additional 3 mL of SNSW was added to Run 1 which reduced the turbidity somewhat though it still was not as clear as Run 2. Runs 1 and 2 were initiated and polymerization continued for about 18 hours. The conversion data and viscosity results for these runs are shown in Table XIV.

TABLE XIV

| Run No. | Conversion, % | Brookfield[a] Viscosity, cp | Inherent[b] Viscosity |
|---|---|---|---|
| 1 | 101 | 5.6 | 4.20 |
| 2 | 86 | 5.1 | 3.94 |

[a]See footnote a Table V.
[b]Determined at 25° C. on a sample diluted to 0.1 wt % polymer in SNSW as described in footnote a Table V.

The results show that a VP/AM (60/40) copolymer can be prepared in an inverse emulsion system in the presence of a brine (SNSW) to high viscosity products at a reasonably good conversion rate.

EXAMPLE XI

Other runs were made at 30° C. using a recipe very similar to that of Example X except that the brine was prepared in situ by charging a commercially available solid salts mixture with water in the preparation of the emulsions. The salts mixture (available from Lake Products Co., Inc., of Ballwin, Mo., prepared according to ASTM D-1141-52) is made to approximate that found in ocean brine composition (Synthetic Ocean Water, "SOW", salt). The recipe used is shown below:

| Recipe | Parts, by wt |
|---|---|
| VP | 60 |
| AM (50% aq. solution) | 80 |

| Recipe | |
|---|---|
| | Parts, by wt |
| Water | 54.93 |
| SOW salt | 5.07 |
| Soltrol 145 | 100 |
| Surfactant | 40 |
| Vazo 33[a] | 0.1 |

[a]Charged as a solution (0.05 g/mL) in VP.

Charge Order (¼ recipe in grams): The SOW salt was added to the water followed by AM and VP. A separate solution of the surfactants (Span & Tween) dissolved in the Soltrol 145 was prepared. The solutions were thoroughly mixed and the Siponic E-2 added ("titrated") to provide visibly stable emulsions.

The surfactants employed are shown in Table XV below.

TABLE XV

| Run No. | Surfactants (g/g) | | Siponic E-2 g |
|---|---|---|---|
| 1 | Span 80/Tween 80 | (3.27/1.73) | 5 |
| 2 | Span 80/Tween 85 | (2.24/2.76) | 5 |
| 3 | Span 85/Tween 80 | (2.65/2.35) | 5 |
| 4 | Span 85/Tween 85 | (1.67/3.37) | 5 |

An additional 1 mL of SNSW was added to Run 1 to reduce turbidity. Runs 1 and 2 were initiated and polymerization continued at 30° C. for about 18 hours. Conversion data and viscosity results are shown in Table XVI.

TABLE XVI

| Run No. | Conversion, % | Brookfield[a] Viscosity, cp | Inherent[b] Viscosity |
|---|---|---|---|
| 1 | 97 | 4.9 | 4.19 |
| 2 | 97 | 5.6 | 4.37 |

[a]See footnote a Table V.
[b]See footnote b Table XIV.

Again, the results show that a VP/AM (60/40) copolymer can be prepared in a inverse emulsion system in the presence of an in situ produced brine to high viscosity products at a reasonably good conversion rate.

EXAMPLE XII

Another series of runs was made at 30° C. for the preparation of VP/AM (60/40) copolymers in an inverse emulsion system. In this series the effect of added NaCl was examined in contrast to the more complex brines used in Examples VII-XI. The recipe employed is shown below.

| Recipe | |
|---|---|
| | Parts, by wt |
| VP | 60 |
| AM (50% aq. solution) | 80 |
| Water | 60 |
| NaCl | variable |
| Soltrol 145 | 100 |
| Surfactant | 40 |
| Vazo 33[a] | 0.1 |
| Thiostop-N[b] | 0.8 |

[a]Charged as a solution in VP (0.05 g/mL).
[b]Thiostop-N is sodium dimethyldithiocarbamate charged as received.

Charge order (¼ recipe in grams): NaCl was added to the water followed by AM and VP. A separate solution of the surfactants (except Siponic E-2) in the Soltrol 145 was prepared. The solutions were thoroughly mixed and 5 g Siponic E-2 added to provide visibly stable emulsions.

The surfactant combinations used and NaCl amounts are shown in Table XVII.

TABLE XVII

| Run No. | Surfactants (g/g) | | NaCl g |
|---|---|---|---|
| 1 | Span 80/Tween 80 | (3.27/1.73) | |
| 2 | " | " | 1.0 |
| 3 | " | " | 0.5 |
| 4 | " | " | 0 |
| 5 | Span 80/Tween 85 | (2.24/2.76) | 1.5 |
| 6 | " | " | 1.0 |
| 7 | " | " | 0.5 |
| 8 | " | " | 0 |
| 9 | Span 80/Span 85/ Tween 80/Tween 85 | (1.25/1.25/ 1.25/1.25) | 0.5 |
| 10 | Span 60/Span 65/ Tween 80/Tween 85 | (1.25/1.25/ 1.25/1.25) | 0.5 |

Prior to initiation each bottle reactor was purged 15 minutes with nitrogen. Polymerization continued for 21 hours at 30° C. then each mixture was charged with the shortstop. Conversion data and viscosity results are shown in Table XVIII.

TABLE XVIII

| Run No. | Conversion % | NaCl g | Brookfield[a] Viscosity | Inherent[b] Viscosity |
|---|---|---|---|---|
| 1 | — | 1.5 | 4.6 | 2.06 |
| 2 | 109 | 1.0 | 5.2 | 0.93 |
| 3 | 105 | 0.5 | 5.5 | 1.00 |
| 4 | 85 | 0 | 4.5 | 1.04 |
| 5 | 101 | 1.5 | 4.9 | 1.72 |
| 6 | 100 | 1.0 | 5.0 | 2.06 |
| 7 | 107 | 0.5 | 4.8 | 0.79 |
| 8 | 98 | 0 | 5.0 | 0.96 |
| 9 | 95 | 0.5 | 4.7 | 1.89 |
| 10 | 103 | 0.5 | 4.9 | 1.68 |

[a]See footnote a of Table V.
[b]See footnote b of Table XIV.

Conversion data showed reasonably good results with the exception of Run 4. However, viscosity values, especially inherent viscosities, seem to be unexpectedly low in view of results obtained in Examples X and XI. The reason for the apparent low values is not known.

EXAMPLE XIII

Additional runs were made using the recipe shown below with different surfactant combinations for polymerizations conducted at 30° C. for about 16 hours.

| Recipe | |
|---|---|
| | Parts, by wt |
| VP | 60 |
| AM | 40 |
| Water | 100 |
| Soltrol 145 | 100 |
| Surfactant | variable |
| Vazo 33[a] | 0.1 |

[a]Charged as a solution in VP (0.05 g/mL).

Charge order (¼ recipe in grams): A solution of AM and VP was prepared in the water component. A separate solution of surfactants (except Siponic component) in Soltrol 145 was prepared. The two solutions were thoroughly mixed and the Siponic component added to provide visibly stable emulsions. The mixtures were purged with $N_2$ then charged with initiator and placed in the 30° C. constant temperature bath.

The surfactant combinations used are shown in Table XIX.

TABLE XIX

| Run No. | Surfactants (g/g) | | Siponic g | Total phm | HLB |
|---|---|---|---|---|---|
| 1 | Span 60/Tween 65 | (2.2/2.8) | $3^a$ | 32 | 8 |
| 2 | Span 80/Tween 80 | (3.7/1.3) | $1^b$ | 24 | 7 |
| 3 | Span 80/Tween 80 | (3.3/1.7) | $3^a$ | 32 | 8 |
| 4 | Span 80/Tween 85 | (2.2/2.8) | $3^a$ | 32 | 8 |
| 5 | Span 80/Atlas G $1096^c$ | (2.4/2.6) | $2^a$ | 28 | 8 |

$^a$Siponic E-2.
$^b$Blend of Siponic C-20/Siponic E-2 at a 37/63 weight ratio.
$^c$Atlas G 1096 is polyoxyethylene (50) sorbitol hexaoleate.

Percent solids data and viscosity measurements are presented in Table XX below.

TABLE XX

| Run No. | Solids, wt % | Brookfield$^a$ Viscosity | Inherent$^b$ Viscosity |
|---|---|---|---|
| 1 | 39.1 | 6.1 | 7.05 |
| 2 | 41.9 | 3.8 | 5.14 |
| 3 | 38.2 | 4.1 | 5.49 |
| 4 | 37.0 | 4.7 | 5.92 |
| 5 | $—^c$ | — | — |

$^a$Model LVT viscometer, UL spindle, 60 rpm, 25° C., determined on sample diluted to 0.25 wt % polymer in SNSW.
$^b$See footnote b of Table XIV.
$^c$Run destabilized during polymerization so that data could not be obtained.

The results showed that copolymers of VP/AM (60/40) with good viscosity values could be obtained using the Span/Tween/Siponic surfactant combination.

EXAMPLE XIV

Other runs were made using the recipe of Example XIII except that the Vazo 33 initiator was replaced by a redox type initiator system. Polymerization was conducted at 5° C. rather than 30° C. used in Example XIII.

The redox system employed p-menthane hydroperoxide (PMHP) (0.06 phm), ferrous sulfate heptahydrate (Fe) (0.0003 phm), sodium formaldehyde sulfoxylate (SFS) (0.05 phm) and ethylene diamine tetraacetic acid tetra sodium salt with 4 moles of water of hydration (Questex 4SW or QSW) (0.001 phm). The PMHP "initiator" was charged as a solution in toluene (0.06 g/mL). The activator was an aqueous solution of 0.003 g Fe, 0.01 g QSW and 0.5 g SFS in 100 mL water. In these (¼ recipe in grams) runs the initiator (PMHP) was charged to the $N_2$ purged mixture of monomers, water, Soltrol and surfactants followed by the activator. The mixtures were then allowed to polymerize at 5° C. for about 16 hours. The surfactants used in these runs are shown in Table XXI below.

TABLE XXI

| Run No. | Surfactants (g/g) | | Siponic g | Total phm | HLB |
|---|---|---|---|---|---|
| 1 | Span 80/Tween 80 | (3.7/1.3) | $1^a$ | 24 | 7 |
| 2 | Span 80/Tween 85 | (2.2/2.8) | $3^b$ | 32 | 8 |
| 3 | Span 80/Atlas G 1096 | (2.4/2.6) | $2^b$ | 28 | 8 |

$^a$See footnote a of Table XIX.
$^b$See footnote b of Table XIX.

The solids data and viscosity results are shown in Table XXII.

TABLE XXII

| Run No. | Solids, wt % | Brookfield$^a$ Viscosity | Inherent$^b$ Viscosity |
|---|---|---|---|
| 1 | 34.0 | 3.7 | 5.02 |
| 2 | 35.0 | 4.5 | 5.66 |
| 3 | 36.0 | 4.2 | 5.42 |

$^{(a)}$See footnote (a) Table XX.
$^{(b)}$See footnote (b) Table XIV.

Other runs were made with similar redox initiator recipes but at 50° C. and with reduced total surfactant levels, e.g., about ½ and ¼ the amounts used in Table XXI. However, each of these runs destabilized rather quickly and no data were obtained.

EXAMPLE XV

Other runs were made using a redox type initiator system for the inverse emulsion polymerization of VP/AM (60/40) at 5° C. for 20 hours wherein the HLB of the surfactant system was 8. The recipe used is shown below.

| Recipe | Parts, by wt |
|---|---|
| VP | 60 |
| AM | 40 |
| Water | 100 |
| Surfactants | variable |
| Soltrol 145 | 100 |
| p-Menthane hydroperoxide | variable |
| $FeSO_4.7H_2O$ | variable |
| Questex 4 SW | variable |
| Sodium formaldehyde sulfoxylate | variable |
| Thiostop N (shortstop) | 0.8 |

Charge Order: The VP and AM were dissolved in water to form an aqueous solution 1. All of the surfactant components were dissolved in Soltrol 145 to form solution 2. The solutions 1 and 2 were thoroughly mixed then purged with $N_2$ for 15 minutes. An aqueous solution of Fe and QSW was then charged followed by an aqueous solution of SFS. The mixtures were cooled to 5° C. and held at that temperature for 30 minutes then charged with PMHP and allowed to polymerize for 20 hours. Shortstop was charged as a 40% by wt aqueous solution.

The surfactants employed in these runs are shown in Table XXIII.

TABLE XXIII

| Run No. | Surfactants (g/g/g) | | Total phm |
|---|---|---|---|
| 1 | Span 80/Tween 80/Siponic E2 | (3.3/1.7/3) | 32 |
| 2 | Span 80/Tween 85/Siponic E2 | (2.2/2.8/3) | 32 |
| 3 | Span 80/G1096/Siponic E2 | (2.4/2.6/2) | 28 |
| 4 | Span 80/Tween 80/Siponic E2 | (1.65/0.85/1.5) | 16 |
| 5 | Span 80/Tween 85/Siponic E2 | (1.1/1.4/1.5) | 16 |
| 6 | Span 80/G1096/Siponic E2 | (1.2/1.3/1) | 14 |
| 7 | Span 80/Tween 80/Siponic E2 | (3.3/1.7/3) | 32 |
| 8 | Span 80/Tween 85/Siponic E2 | (2.2/2.8/3) | 32 |
| 9 | Span 80/G1096/Siponic E2 | (2.4/2.6/2) | 28 |
| 10 | Span 80/Tween 80/Siponic E2 | (3.3/1.7/3) | 32 |
| 11 | Span 80/Tween 85/Siponic E2 | (2.2/2.8/3) | 32 |
| 12 | Span 80/G1096/Siponic E2 | (2.4/2.6/2) | 28 |

The amounts of redox initiator system components and the results obtained are shown in Table XXIV.

TABLE XXIV

| Run No. | PMHP phm | Fe phm | SFS phm | Solids Wt % | Brookfield[a] Viscosity | Inherent[b] Viscosity |
|---|---|---|---|---|---|---|
| 1 | 0.06 | 0.003 | 0.05 | 34.4 | 3.8 | 5.13 |
| 2 | " | " | " | 37.5 | 4.3 | 5.63 |
| 3 | " | " | " | 21.2 | ND[d] | ND |
| 4 | " | " | " | —[c] | " | " |
| 5 | " | " | " | 39.1 | " | " |
| 6 | " | " | " | —[c] | " | " |
| 7 | 0.12 | " | 0.10 | 36.1 | 3.9 | 5.20 |
| 8[e] | " | " | " | 7.7 | 1.1 | 0.03 |
| 9[e] | " | " | " | 16.3 | 1.1 | 0.26 |
| 10 | " | 0.001 | " | 39.4 | 5.3 | 6.59 |
| 11[e] | " | " | " | 25.7 | ND | ND |
| 12[e] | " | " | " | 12.3 | 1.3 | 0.06 |

[a] See footnote (a) Table XX.
[b] See footnote (b) Table XIV.
[c] Destabilized during run.
[d] Not Determined
[e] Boosted with 0.06 phm PMHP and 0.05 phm SFS at 20 hours and polymerized for an additional 24 hours.

Although several runs had poor results in terms of solids content (low conversion) and low viscosities, other runs showed that high viscosity values and solids content could be achieved with a redox initiator system and a Span/Tween/Siponic surfactant blend at HLB 8.

EXAMPLE XVI

Several additional runs were made using a Span 80/Tween85/Siponic E-2 surfactant system, a redox initiator system of the type used in Examples XIV and XV, and various combinations of monomers. The recipes are shown below.

| | Recipes Parts, by wt. | | | | | |
|---|---|---|---|---|---|---|
| | 1 | 2 | 3 | 4 | 5 | 6 |
| VP | 50 | 30 | — | — | 30 | 10 |
| AM | 50 | 15 | — | 40 | 10 | — |
| Sodium AMPS[a] | — | 55 | 100 | 60 | 55 | 90 |
| Acrylic Acid | — | — | — | — | 5 | — |
| Water | 120 | 120 | 120 | 110 | 110 | 110 |
| Soltrol 145 | 100 | 100 | 100 | 90 | 80 | 90 |
| Span 80 | 9 | 9 | 9 | 9 | 9 | 9 |
| Tween 85 | 11 | 11 | 11 | 11 | 11 | 11 |
| Siponic E-2 | 12 | 12 | 12 | 12 | 12 | 12 |
| p-Menthane Hydroperoxide | 0.054 | 0.054 | 0.054 | 0.054 | 0.054 | 0.054 |
| $FeSO_4 \cdot 7H_2O$ | 0.00001 | 0.00001 | 0.00001 | 0.00001 | 0.00001 | 0.00001 |
| Questex 4 SW | 0.00003 | 0.00003 | 0.00003 | 0.00003 | 0.00003 | 0.00003 |
| Sodium Formaldehyde sulfoxylate | 0.05 | 0.05 | 0.05 | 0.05 | 0.05 | 0.05 |

[a] Sodium AMPS is sodium 2-acrylamido-2-methylpropane sulfonate

Each recipe (full recipe, in grams) was mixed and inverse emulsion polymerization carried out in six corresponding runs 1-6 using essentially the same charge order and polymerization conditions described in Example XV. Viscosity and percent solids results for these runs are shown in Table XXV.

TABLE XXV

| Run No. | Solids wt. % | Inherent[a] Viscosity |
|---|---|---|
| 1 | 28.4 | 7.7 |
| 2 | 28.4 | 8.1 |
| 3 | 28.4 | >10 |
| 4 | 30.1 | 10.4 |
| 5 | 32.1 | 7.3 |
| 6 | 30.1 | 6.9 |

[a] See footnote (b) of Table XIV.

All of the runs achieved highly stable emulsions and, as can be seen from Table XXV, desirably high viscosities.

While this invention has been described in detail for the purpose of illustration it is not to be construed as limited thereby but is intended to cover all changes and modifications within the spirit and scope thereof.

EXAMPLE XVII

Additional runs were conducted for the copolymerization of acrylamide (AM) and sodium 2-acrylamido-2-methylpropane sulfonate (NaAMPS) in an inverse emulsion polymerization system. The surfactant blends employed Atmos 300 (mono-and diglycerides of fat forming fatty acids from ICI Americas, Inc.), G1096 (polyoxyethylene (5) sorbitol hexaoleate) and Siponic E-2 (SE-2). The recipe employed in this series of runs is shown below.

| Recipe | Parts, by Weight |
|---|---|
| AM[a] | 40 |
| NaAMPS[a] | 60 |
| Water | 101 |
| Soltrol 145 | 104 |
| Emulsifier: | |
| Atmos 300 | Variable |
| G1096 | Variable |
| Siponic E-2 | Variable |
| Initiator: | |
| PMHP | 0.024 |
| $FeSO_4 \cdot 7H_2O$ | 0.00002 |
| Questex 4SW | 0.00006 |
| SFS | 0.025 |
| Shortstop: | |
| Thiostop-N | 0.4 |
| Temperature, °C. | 5 |
| Time, hours | 18 |

[a] Charged as a 50% by weight aqueous solution.

The charging procedure for this series of runs was substantially the same as that employed in Example XV. The results obtained in this series of runs are presented in Table XXVI below.

Runs 1 and 7 are comparative (control) runs since no Siponic E-2 was employed in the surfactant.

TABLE XXVI

| Run No. | Surfactant, phm | | | HLB | Solids wt % | Inherent Viscosity[a] |
|---|---|---|---|---|---|---|
| | Atmos 300 | G1096 | SE-2 | | | |
| 1 | 10.2 | 9.8 | 0 | 7 | 36.6 | ND[b] |
| 2 | 10.2 | 9.8 | 4 | 7.16 | 37.7 | ND |

TABLE XXVI-continued

| Run No. | Surfactant, phm | | | | Solids wt % | Inherent Viscosity[a] |
|---|---|---|---|---|---|---|
| | Atmos 300 | G1096 | SE-2 | HLB | | |
| 3 | 10.2 | 9.8 | 8 | 7.29 | 38.4 | ND |
| 4 | 10.2 | 9.8 | 12 | 7.38 | 39.0 | ND |
| 5 | 10.2 | 9.8 | 16 | 7.44 | 38.4 | ND |
| 6 | 10.2 | 9.8 | 20 | 7.55 | 39.4 | 8.6 |
| 7 | 8.0 | 12.0 | 0 | 8.0 | 37.8 | ND |
| 8 | 8.0 | 12.0 | 4 | 8.0 | 37.9 | ND |
| 9 | 8.0 | 12.0 | 8 | 8.0 | 38.8 | 9.4 |
| 10 | 8.0 | 12.0 | 12 | 8.0 | 38.8 | 9.2 |
| 11 | 8.0 | 12.0 | 16 | 8.0 | 39.6 | 9.4 |
| 12 | 8.0 | 12.0 | 20 | 8.0 | 40.3 | 8.3 |

[a]See footnote (b) of Table XIV.
[b]Not determined.

The latexes for Runs 1–5, 7 and 8 appeared to be somewhat unstable while the latexes for Runs 9–12 showed a tendency for phase separation on standing but were easily dispersed on mild agitation. The latex for Run 6 was viscous but stable. The inherent viscosity (I.V.) values were quite high indicative of high molecular weight polymers suitable for use in applications where such high molecular weight water soluble polymers are desired.

EXAMPLE XVIII

Additional runs were conducted in essentially the same manner as the series shown in Example XVII except that kerosene was used instead of Soltrol 145 as the hydrocarbon phase and a polymerization time of 20 hours rather than 18 hours was employed. However, four parts by weight of Soltrol 145 was used in preparing the redox initiator system instead of kerosene. The results obtained in this series of runs is shown in Table XXVII below. Runs 1 and 7 are control runs since no Siponic E-2 was used in the surfactant.

TABLE XXVII

| Run No. | Surfactant, phm | | | | Solids wt % | Inherent Viscosity[a] |
|---|---|---|---|---|---|---|
| | Atmos 300 | G1096 | SE-2 | HLB | | |
| 1 | 10.2 | 9.8 | 0 | 7 | D[b] | ND[c] |
| 2 | 10.2 | 9.8 | 4 | 7.16 | D | ND |
| 3 | 10.2 | 9.8 | 8 | 7.29 | D | ND |
| 4 | 10.2 | 9.8 | 12 | 7.38 | 37.7 | 8.1 |
| 5 | 10.2 | 9.8 | 16 | 7.44 | 37.9 | 9.0 |
| 6 | 10.2 | 9.8 | 20 | 7.55 | 37.8 | 9.4 |
| 7 | 8.0 | 12.0 | 0 | 8.0 | D | ND |
| 8 | 8.0 | 12.0 | 4 | 8.0 | D | ND |
| 9 | 8.0 | 12.0 | 8 | 8.0 | 36.3 | 9.0 |
| 10 | 8.0 | 12.0 | 12 | 8.0 | 37.8 | 9.3 |
| 11 | 8.0 | 12.0 | 16 | 8.0 | 37.4 | 9.3 |
| 12 | 8.0 | 12.0 | 20 | 8.0 | 37.9 | 9.4 |

[a]See footnote (b) of Table XIV.
[b]D indicates latex destabilized.
[c]Not determined.

Latexes from Runs 11 and 12 were viscous and showed a slight tendency toward phase separation on standing. Latexes from Runs 4–6 and 10 showed a more pronounced tendency to phase separate but were easily dispersed on mild agitation. The latex from Run 9 also settled on standing but was difficult to disperse on agitation. The I.V. values were again quite high as in the runs of Example XVII.

A comparison of the overall results in Examples XVII and XVIII indicates that Soltrol 145 was better than kerosene in terms latex stability behaviour. The addition of Siponic E-2 as part of the surfactant also significantly improved the latex stability characteristics with Soltrol 145 or kerosene as the hydrocarbon phase, particularly at HLB values of 7.55 and 8.0.

EXAMPLE XIX

Additional control runs were conducted in the manner of Example XVII but which employed mixtures of Atmos 300 and G1096 in different amounts as the surfactant and which used Soltrol 145 or kerosene as the hydrocarbon phase. These runs were conducted for 17 hours. The results obtained in these runs are presented in Table XXVIII.

TABLE XXVIII

| Run No. | Hydrocarbon phase | Surfactant, phm | | | Solids wt % | Inherent Viscosity[b] |
|---|---|---|---|---|---|---|
| | | Atmos 300 | G1096 | HLB | | |
| 1 | S-145[a] | 4 | 6 | 8 | 37.8 | 10.8 |
| 2 | S-145 | 6 | 9 | 8 | 34.7 | —[c] |
| 3 | S-145 | 8 | 12 | 8 | 37.2 | —[c] |
| 4 | Kerosene | 4 | 6 | 8 | 36.2 | 11.4 |
| 5 | Kerosene | 6 | 9 | 8 | 39.0 | 10.7 |
| 6 | Kerosene | 8 | 12 | 8 | 37.8 | —[c] |

[a]Soltrol 145.
[b]See footnote (b) of Table XIV.
[c]These runs failed to polymerize for unknown reasons.

Runs 1, 4 and 5 produced very high inherent viscosity polymers but each latex showed tendency toward phase separation on standing that could be dispersed easily on mild agitation. The erratic polymerization behaviour, e.g. Runs 2, 3 and 6, is not currently understood.

EXAMPLE XX

Further runs were made according to my invention in the manner of Example XVII but which employed different amounts of water and hydrocarbon (Soltrol 145 or kerosene). These runs employed 17 hours for the polymerization reaction. Each run also employed Atmos 300, G1096 and Siponic E-2 as the surfactant at levels of 8, 12, and 12 phm respectively. The HLB value was 8 for each run. The results obtained are shown in Table XXIX below.

TABLE XXIX

| Run No. | Hydrocarbon Type | Water phm | Solids wt % | Inherent Viscosity[a] |
|---|---|---|---|---|
| | | phm | | |
| 1 | S-145 | 94 | 91 | 39.7 | 9.7 |
| 2 | S-145 | 94 | 101 | 38.9 | 9.9 |
| 3 | S-145 | 104 | 91 | 38.8 | 9.7 |
| 4 | S-145 | 104 | 101 | 37.4 | 9.8 |
| 5 | S-145 | 114 | 91 | 38.0 | 8.1 |
| 6 | S-145 | 114 | 101 | 36.0 | 10.0 |
| 7 | Kerosene | 94 | 91 | 39.2 | 10.7 |
| 8 | Kerosene | 94 | 101 | 39.0 | 10.7 |
| 9 | Kerosene | 104 | 91 | 38.5 | 10.5 |
| 10 | Kerosene | 104 | 101 | 35.8 | 10.9 |
| 11 | Kerosene | 114 | 91 | 36.4 | 10.7 |
| 12 | Kerosene | 114 | 101 | 34.9 | 10.6 |

[a]See footnote (b) of Table XIV.

The results of this series of runs show the production of high inherent viscosity water soluble AM/NaAMPS (40/60) copolymers. Although the inherent viscosity values for runs 1, 4 and 5 of Example XIX are higher than the values obtained in the runs of this example, the latex stability was clearly improved in the runs made according to my invention. The latexes for runs 2 and 11 showed no signs of phase separation and the latexes for all the other runs though showing signs of phase separation were easily dispersed on mild agitation.

EXAMPLE XXI

Additional runs were conducted for the copolymerization of AM/NaAMPS (40/60) in the manner of Example XVII but which utilized different amounts of Atmos 300, G1096 and Siponic E-2 in the surfactant. The hydrocarbon phase employed was Soltrol 145 (Runs 1-8) or kerosene (Runs 9-16) in an amount of 94 phm. The results obtained in this series of runs are shown in Table XXX below.

TABLE XXX

| Run No. | Surfactant, phm | | | | Solids wt % | Inherent Viscosity[a] |
|---|---|---|---|---|---|---|
| | Atmos 300 | G1096 | SE-2 | HLB | | |
| 1 | 8 | 12 | 0 | 8 | 36.7 | 10.4 |
| 2 | 6 | 9 | 0 | 8 | 37.1 | 10.8 |
| 3 | 4 | 6 | 0 | 8 | 34.7 | 10.9 |
| 4 | 2 | 3 | 0 | 8 | D[b] | ND[c] |
| 5 | 8 | 12 | 12 | 8 | 37.8 | 9.7 |
| 6 | 6 | 9 | 9 | 8 | 36.7 | 10.2 |
| 7 | 4 | 6 | 6 | 8 | 38.2 | 10.9 |
| 8 | 2 | 3 | 3 | 8 | D | ND |
| 9 | 8 | 12 | 0 | 8 | 37.9 | 11.8 |
| 10 | 6 | 9 | 0 | 8 | 37.7 | 12.1 |
| 11 | 4 | 6 | 0 | 8 | D | ND |
| 12 | 2 | 3 | 0 | 8 | D | ND |
| 13 | 8 | 12 | 12 | 8 | 38.1 | 10.8 |
| 14 | 6 | 9 | 9 | 8 | 36.7 | 10.8 |
| 15 | 4 | 6 | 6 | 8 | 36.3 | 12.1 |
| 16 | 2 | 3 | 3 | 8 | D | ND |

[a]See footnote (b) of Table XIV.
[b]D indicates latex destabilized.
[c]Not determined.

Runs 1-4 and 9-12 are control runs since Siponic E-2 was not utilized in the surfactant employed in these runs. Runs 4, 8, 11, 12 and 16 indicates that low levels of surfactant causes latex destabilization with or without the use of Siponic E-2. However, a visual comparison of latexes from Run 3 with Run 7 and Run 11 with Run 15 clearly showed the latex stabilizing effect of the addition of Siponic E-2 to the surfactant. Inherent viscosity values were quite high indicating suitable high molecular weight water soluble AM/NaAMPS (40/60) copolymers had been obtained.

EXAMPLE XXII

Further runs were conducted according to my invention for the preparation of AM/NaAMPS (40/60) copolymers in the manner of Example XVII using as surfactant mixtures of Atmos 300, G1096, and Siponic E-2 at levels of 8, 12, and 12 phm respectively (HLB 8). In this series the hydrocarbon phase was Soltrol 145 or kerosene and the polymerization temperature was 5° or 30° C. for 20 hours. The results obtained in this series of runs are presented below in Table XXXI.

TABLE XXXI

| Run No. | Temperature °C. | Hydrocarbon Type | Solids wt % | Inherent Viscosity[a] |
|---|---|---|---|---|
| 1 | 5 | S-145 | 38.5 | 9.9 |
| 2 | 5 | kerosene | 39.9 | 10.9 |
| 3 | 30 | S-145 | 39.7 | 9.5 |
| 4 | 30 | kerosene | 38.6 | 10.2 |

[a]See footnote (b) of Table XIV.

The results shown in Table XXXI indicate that suitable high inherent viscosity water soluble copolymers of acrylamide (AM) and sodium 2-acrylamido-2-methylpropanesulfonic acid (NaAMPS) were obtained in inverse emulsion form on polymerization at 5° C. or 30° C. with a redox initiator system.

EXAMPLE XXIII

Additional runs were conducted according to my invention for the preparation of AM/NaAMPS (40/60) copolymer in the general manner of Example XVII except that 111 phm water and 94 phm Soltrol 145 were used. Different amounts of Atmos 300, G1096, and Siponic E-2 were employed in this series of runs. The results obtained in this series of runs are shown in Table XXXII below.

TABLE XXXII

| Run No. | Surfactant, phm | | | | Solids wt % | Inherent Viscosity[a] |
|---|---|---|---|---|---|---|
| | Atmos 300 | G1096 | SE-2 | HLB | | |
| 1 | 8 | 12 | 12 | 8 | 37.8 | 9.4 |
| 2 | 6 | 9 | 9 | 8 | 37.7 | 8.9 |
| 3 | 4 | 6 | 6 | 8 | 35.7 | 9.9 |
| 4 | 2 | 3 | 3 | 8 | D[b] | ND[c] |

[a]See footnote (b) of Table XIV.
[b]D indicates latex destabilized.
[c]Not determined.

The results in Table XXXII indicate that as the total surfactant level drops below about 15-16 phm the latex tends to destabilize during polymerization.

EXAMPLE XXIV

Runs were conducted for the copolymerization of N-vinyl-2-pyrrolidone (VP), acrylamide (AM), sodium 2-acrylamido-2-methylpropanesulfonic acid (NaAMPS) and acrylic acid (AA) in an inverse emulsion polymerization system. These runs utilized a surfactant according to my invention of Atmos 300, G1096, and Siponic E-2. The recipe employed in this series of runs is shown below.

| Recipe | |
|---|---|
| | Parts, by weight |
| VP | 30 |
| AM[a] | 10 |
| NaAMPS[a] | 55 |
| AA | 5 |
| Water | Variable |
| Soltrol 145 | Variable |
| Emulsifier: | |
| Atmos 300 | 8 or 6 |
| G1096 | 12 or 9 |
| Siponic E-2 | 12 or 9 |
| Initiator: | |
| PMHP | 0.024 |
| $FeSO_4 \cdot 7H_2O$ | 0.00002 |
| Questex 4SW | 0.00006 |
| SFS | 0.025 |
| Temperature, °C. | 5 |
| Time, hours | 24 |

[a]Charged as 50% by weight aqueous solution.

Each run was conducted substantially in the following manner.

The monomers were mixed with substantially all of the water and the mixture sparged with nitrogen. A second mixture of the emulsifier components in substantially all of the Soltrol 145 was prepared and sparged with nitrogen. The second mixture was added to the first mixture in a glass bottle reaction vessel with agitation and the vessel pressured to 25 psig with nitrogen. The mixture was cooled to 5° C. and charged with the initiator system. The bottle reactor was tumbled in a constant temperature water bath to provide agitation to the polymerization mixture.

The results obtained in this series of runs are presented in Table XXXIII below.

TABLE XXXIII

| Run No. | H₂O ohm | Soltrol 145 phm | Surfactant, ohm | | | | Solids wt % | I.V.(a) |
|---|---|---|---|---|---|---|---|---|
| | | | Atmos 300 | G1096 | SE-2 | HLB | | |
| 1 | 100 | 80 | 8 | 12 | 12 | 8 | 42.0 | 7.0 |
| 2 | 112 | 90 | 8 | 12 | 12 | 8 | 38.6 | 7.2 |
| 3 | 93 | 75 | 8 | 12 | 12 | 8 | 43.9 | 7.1 |
| 4 | 100 | 80 | 6 | 9 | 9 | 8 | 40.9 | 7.5 |
| 5 | 116 | 93 | 6 | 9 | 9 | 8 | 36.3 | 7.2 |
| 6 | 98 | 78 | 6 | 9 | 9 | 8 | 39.9 | 7.2 |

(a)See footnote (b) of Table XIV.

All of the latexes showed some tendency toward phase separation but only the products of Runs 3 and 6 showed any sign of polymer settling from the latex. However, all latexes except the product from Run 6 were easily dispersed on mild agitation. The latex from Run 6 required more vigorous agitation to be dispersed after standing.

EXAMPLE XXV

Additional runs were conducted according to my invention for the inverse emulsion copolymerization of VP, AM, NaAMPS and AA in substantially the same manner as Example XXIV. Different amounts of water, Soltrol 145, and surfactant components were employed in this series of runs. The results obtained in this series of runs are presented below in Table XXXIV.

TABLE XXXIV

| Run No. | H₂O ohm | Soltrol 145 phm | Surfactant, ohm | | | | Solids wt % | I.V.(a) |
|---|---|---|---|---|---|---|---|---|
| | | | Atmos 300 | G1096 | SE-2 | HLB | | |
| 1 | 110 | 90 | 8 | 12 | 12 | 8 | 40.1 | 7.3 |
| 2 | 111 | 91 | 8 | 12 | 12 | 8 | 39.6 | 7.3 |
| 3 | 92 | 76 | 8 | 12 | 12 | 8 | 44.7 | 7.4 |
| 4 | 110 | 90 | 5 | 7.5 | 7.5 | 8 | 37.7 | 7.3 |
| 5 | 117 | 96 | 5 | 7.5 | 7.5 | 8 | 36.8 | 7.3 |
| 6 | 99 | 81 | 5 | 7.5 | 7.5 | 8 | 41.1 | 7.5 |

(a)See footnote (b) of Table XIV.

All of the latexes showed some tendency toward phase separation, but those of Runs 1-3 were easily dispersed on mild agitation while those of Runs 4-6 were less stable and more difficult to disperse on agitation.

EXAMPLE XXVI

Two other runs (duplicates) were carried out according to my invention for the copolymerization of AM and NaAMPS (40/60) in substantially the same manner as described in Example XVII above. Both runs utilized 117 phm water and 96 phm Soltrol 145. The polymerization time was 21 hours in these runs. The results obtained in these runs are presented in Table XXXV below.

TABLE XXXV

| Run No. | Surfactants, phm | | | | Solids wt % | Inherent Viscosity(a) |
|---|---|---|---|---|---|---|
| | Atmos 300 | G1096 | SE-2 | HLB | | |
| 1 | 5 | 7.5 | 7.5 | 8 | 38.0 | 9.0 |
| 2 | 5 | 7.5 | 7.5 | 8 | 38.0 | 9.1 |

(a)See footnote (b) of Table XIV.

The latexes from these runs tended to phase separate with some indication of polymer settling out on standing. The solids and inherent viscosity values indicate good reproducibility was achieved in these runs.

EXAMPLE XXVII

Additional runs were conducted according to my invention for the copolymerization of AM and NaAMPS (40/60) in substantially the same manner as described in Example XVII above. Different amounts of water, Soltrol 145 and surfactant were employed in these runs. The results obtained in these runs are shown in Table XXXVI below.

TABLE XXXVI

| Run No. | H₂O ohm | Soltrol 145 phm | Surfactant, ohm | | | | Solids wt % | I.V.(a) |
|---|---|---|---|---|---|---|---|---|
| | | | Atmos 300 | G1096 | SE-2 | HLB | | |
| 1 | 110 | 90 | 8 | 12 | 12 | 8 | 40.2 | 9.5 |
| 2 | 110 | 91 | 8 | 12 | 12 | 8 | 39.8 | 9.6 |
| 3 | 110 | 90 | 6 | 9 | 9 | 8 | 39.1 | 10.2 |
| 4 | 115 | 94 | 6 | 9 | 9 | 8 | 38.6 | 10.0 |
| 5 | 110 | 90 | 5 | 7.5 | 7.5 | 8 | 38.4 | 10.2 |
| 6 | 117 | 96 | 5 | 7.5 | 7.5 | 8 | 37.4 | 10.3 |

(a)See footnote (b) of Table XIV.

All the latexes appeared to of good stability with very high inherent viscosity values indicative of high molecular weight water soluble polymers.

EXAMPLE XXVIII

Two further runs were conducted according to my invention for the copolymerization of AM and NaAMPS (40/60) in an inverse emulsion polymerization system. These runs used azo initiators at a polymerization temperature of 30° C. for 18 hours. Run 1 employed 2,2'-azobis(N,N'-dimethyleneisobutyramidine)-dihydrochloride (VA-044 Wako Industries) while Run 2 used 2,2'-azobis (2,4-dimethyl-4-methoxyvaleronitrile) (Vazo 33-duPont). Both were employed at a level of 0.1 phm. The results obtained in these runs are shown in Table XXXVII below.

TABLE XXXVII

| Run No. | H₂O ohm | Soltrol 145 phm | Surfactant, ohm | | | | Solids wt % | I.V.(a) |
|---|---|---|---|---|---|---|---|---|
| | | | Atmos 300 | G1096 | SE-2 | HLB | | |
| 1 | 117 | 91 | 5 | 7.5 | 7.5 | 8 | 38.0 | 6.9 |
| 2 | 112 | 96 | 5 | 7.5 | 7.5 | 8 | 38.5 | 8.8 |

(a)See footnote (b) of Table XIV.

The latex from Run 1 was clearly less stable than that from Run 2 which showed no tendency to phase separate. The inherent viscosity value for Run 2 was also significantly higher than that obtained in Run 1.

That which is claimed is:

1. A surfactant composition consisting essentially of
   (a) at least one glyceride,
   (b) at least one polyethoxylated sorbitol fatty acid ester, and
   (c) at least one polyethoxylated fatty alcohol, wherein said composition has an HLB number within the range of about 7 to about 9.

2. A surfactant according to claim 1 wherein said glyceride component is selected from the group consisting of mono- and diglycerides of fatty acids.

3. A surfactant according to claim 1 wherein said polyethoxylated sorbitol fatty acid ester is polyoxyethylene (50) sorbitol hexaoleate.

4. A surfactant according to claim 1 wherein said polyethoxylated fatty alcohol is selected from the group consisting of polyethoxylated cetyl alcohol and polyethoxylated stearyl alcohol, wherein the number of oxyethylene repeating units is about 4.

5. A surfactant according to claim 2 wherein said polyethoxylated sorbitol fatty acid ester is polyoxyethylene (50) sorbitol hexaoleate.

6. A surfactant according to claim 5 wherein said polyethoxylated fatty alcohol is selected from the group consisting polyethoxylated cetyl alcohol and polyethoxylated stearyl alcohol, wherein the number of oxyethylene repeating units is about 4.

* * * * *